(12) United States Patent
Sawaguchi et al.

(10) Patent No.: US 11,654,601 B2
(45) Date of Patent: May 23, 2023

(54) RESIN SHEET AND METHOD OF PRODUCING RESIN SHEET

(71) Applicant: ZEON CORPORATION, Tokyo (JP)

(72) Inventors: Taichi Sawaguchi, Tokyo (JP); Hironari Sudeji, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/754,116

(22) PCT Filed: Sep. 15, 2020

(86) PCT No.: PCT/JP2020/034989
§ 371 (c)(1),
(2) Date: Mar. 24, 2022

(87) PCT Pub. No.: WO2021/065489
PCT Pub. Date: Apr. 8, 2021

(65) Prior Publication Data
US 2022/0288820 A1 Sep. 15, 2022

(30) Foreign Application Priority Data
Sep. 30, 2019 (JP) .............................. JP2019-180115

(51) Int. Cl.
*B29C 43/22* (2006.01)
*B29C 43/52* (2006.01)
*B29L 11/00* (2006.01)

(52) U.S. Cl.
CPC ............ *B29C 43/222* (2013.01); *B29C 43/52* (2013.01); *B29K 2901/12* (2013.01); *B29L 2011/0016* (2013.01)

(58) Field of Classification Search
None
See application file for complete search history.

(56) References Cited

FOREIGN PATENT DOCUMENTS

JP 2012181515 A 9/2012
WO 2017126599 A1 7/2017

OTHER PUBLICATIONS

Apr. 5, 2022, International Preliminary Report on Patentability issued in the International Patent Application No. PCT/JP2020/034989.

*Primary Examiner* — Robert J Grun
(74) *Attorney, Agent, or Firm* — Kenja IP Law PC (57) ABSTRACT

Provided is a resin sheet including a plurality of aspheric sections having low variation of thickness precision and high shape precision. A method of producing a resin sheet includes hot press forming a thermoplastic resin film formed using a thermoplastic resin so as to produce a resin sheet including a plurality of aspheric sections that are separated from one another. The hot press forming is performed by increasing the pressing pressure to a final pressing pressure with an average pressure increase rate of 0.1 MPa/s or less at a pressing temperature that is at least 40° C. higher than the glass-transition temperature of the thermoplastic resin.

6 Claims, 1 Drawing Sheet

RESIN SHEET AND METHOD OF PRODUCING RESIN SHEET

TECHNICAL FIELD

The present disclosure relates to a resin sheet and a method of producing a resin sheet, and, in particular, relates to a resin sheet and a method of producing a resin sheet that are useful in production of a transmissive optical element.

BACKGROUND

In recent years, progress has been made with respect to reducing the weight, size, and thickness of electronic and electrical devices, and there has also been increasing need to reduce the thickness and size of camera units and the like that are mounted in such electronic and electrical devices. There is also demand for further enhancement of the image quality of such camera units and the like, and thus it is desirable for lenses, prisms, and other such transmissive optical elements that are included in these optical devices to have high performance.

In general, transmissive optical elements such as lenses that are adopted in camera units and the like have conventionally been produced by injection molding. However, when a lens is produced by injection molding, it is difficult to completely eliminate weld line formation in the resultant lens. Moreover, there is a high likelihood of birefringence arising in a lens obtained by injection molding. This makes it difficult to sufficiently increase the proportion occupied by a region that can display sufficiently high optical performance in an obtained lens, and thus, even when a small diameter lens having a diameter of less than 1 cm is formed by injection molding, it is difficult to cause adequate function thereof as a lens.

For this reason, methods other than injection molding have been studied in recent years as methods of producing transmissive optical elements such as small diameter lenses. For example, Patent Literature (PTL) 1 discloses a technique for producing a microlens array including numerous microlenses arranged continuously without gaps therebetween by sandwiching a lens shaping material between a first mold provided with a plurality of first concavo-convex structures that form a first lens surface and a second mold including a plurality of second concavo-convex structures that form a second lens surface and performing hot pressing treatment of the lens shaping material.

CITATION LIST

Patent Literature

PTL 1: JP2012-181515A

SUMMARY

Technical Problem

However, when the conventional technique using press forming described above has been adopted in order to produce a resin sheet including a plurality of aspheric sections that can be used as lenses or the like, for example, it has not been possible to obtain a resin sheet including a plurality of aspheric sections having low variation of thickness precision and high shape precision.

Accordingly, an object of the present disclosure is to provide a resin sheet including a plurality of aspheric sections having low variation of thickness precision and high shape precision.

Solution to Problem

The inventors conducted diligent investigation to achieve the object set forth above. The inventors discovered that by performing hot press forming of a resin sheet under specific conditions, it is possible to obtain a resin sheet including a plurality of aspheric sections having low variation of thickness precision and high shape precision. In addition, the inventors discovered that by providing a resin sheet with a specific shape, it is possible to reduce variation of thickness precision and increase shape precision of aspheric sections. Based on the new findings set forth above, the inventors completed the present disclosure.

Specifically, the present disclosure aims to advantageously solve the problem set forth above, and a presently disclosed method of producing a resin sheet comprises hot press forming a thermoplastic resin film formed using a thermoplastic resin so as to produce a resin sheet including a plurality of aspheric sections that are separated from one another, wherein the hot press forming is performed by increasing pressing pressure to a final pressing pressure with an average pressure increase rate of 0.1 MPa/s or less at a pressing temperature that is at least 40° C. higher than a glass-transition temperature of the thermoplastic resin. Setting the average pressure increase rate of the pressing pressure and the pressing temperature within specific ranges in this manner enables simple production of a resin sheet including a plurality of aspheric sections having low variation of thickness precision and high shape precision.

Note that the "glass-transition temperature of the thermoplastic resin" referred to in the present disclosure can be measured based on JIS K7121.

In the presently disclosed method of producing a resin sheet, the pressing pressure is preferably increased to the final pressing pressure at a constant pressure increase rate of 0.1 MPa/s or less. By keeping the pressure increase rate of the pressing pressure constant, shape precision of the aspheric sections can be further increased, and birefringence and variation of thickness precision of the aspheric sections can be further reduced.

In the presently disclosed method of producing a resin sheet, at least one surface of the aspheric sections preferably has a thickness direction cross-sectional shape that is a shape including an inflection point. An aspheric section having such a shape can advantageously be used as a transmissive optical element such as a lens.

Moreover, the present disclosure aims to advantageously solve the problem set forth above, and a presently disclosed resin sheet is formed using a thermoplastic resin and comprises a plurality of aspheric sections, wherein arrangement density of the aspheric sections is 0.16 sections/cm$^2$ or more, minimum spacing between adjacent aspheric sections is 1.0 mm or more, diameter of the aspheric sections in plan view is not less than 1 mm and not more than 15 mm, retardation of the aspheric sections is 50 nm or less, and thickness of a thinnest section is 500 μm or less. When the arrangement density, minimum spacing, diameter, and retardation of the aspheric sections and the thickness of the thinnest section are within specific ranges in this manner, variation of thickness precision of the aspheric sections can be reduced, and shape precision of the aspheric sections can be increased.

Note that the "retardation" referred to in the present disclosure can be measured by a method described in the EXAMPLES section.

In the presently disclosed resin sheet, variation of thickness precision of the aspheric sections is preferably 0.2 μm or less. When variation of thickness precision of the aspheric sections is 0.2 μm or less, birefringence can be sufficiently reduced.

Note that the "variation of thickness precision" referred to in the present disclosure can be measured by a method described in the EXAMPLES section.

In the presently disclosed resin sheet, at least one surface of the aspheric sections preferably has a thickness direction cross-sectional shape that is a shape including an inflection point. An aspheric section having such a shape can advantageously be used as a transmissive optical element such as a lens.

Advantageous Effect

According to the present disclosure, it is possible to provide a resin sheet including a plurality of aspheric sections having low variation of thickness precision and high shape precision.

BRIEF DESCRIPTION OF THE DRAWING

In the accompanying drawing.

DETAILED DESCRIPTION

The following provides a detailed description of embodiments of the present disclosure. The presently disclosed method of producing a resin sheet can, for example, be used in production of the presently disclosed resin sheet. Moreover, a resin sheet according to the present disclosure can suitably be used to produce a transmissive optical element such as an optical lens or a prism, for example, but is not specifically limited to being used in this manner. The term "optical lens" as used herein refers to a transparent body that displays a refraction effect of light. Moreover, the term "prism" refers to a transparent polyhedron that displays a dispersion effect, refraction effect, total reflection effect, or birefringence effect of light. By using a resin sheet according to the present disclosure, it is possible to efficiently obtain a transmissive optical element having high shape precision and low birefringence. More specifically, by using a resin sheet according to the present disclosure, it is possible to suitably produce aspheric lenses having various shapes such as aspheric lenses having an inflection point at one surface and/or both surfaces.

Such aspheric lenses can suitably be used as lenses for camera units in small electronic and electrical devices, for example.

(Resin Sheet)

Figure 1:
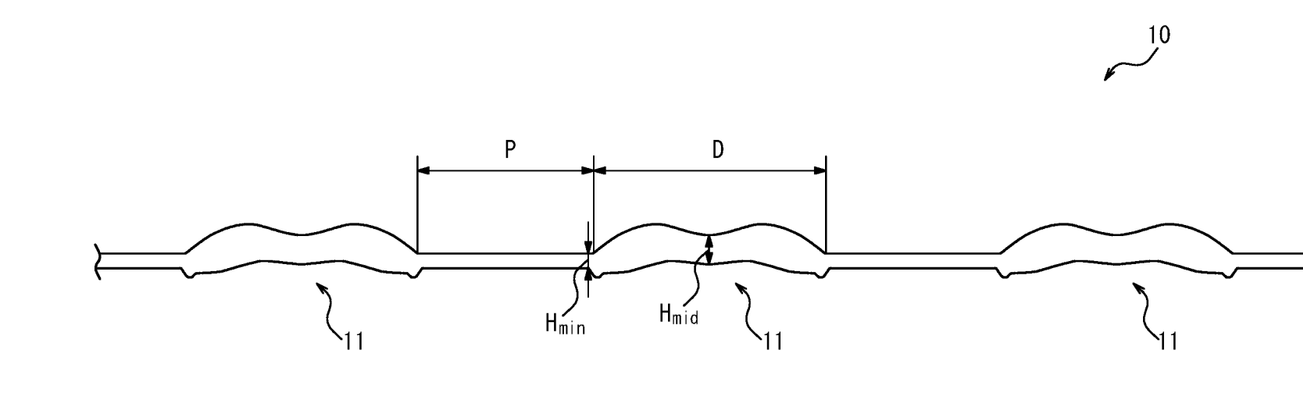
FIG. 1 is a cross-sectional view illustrating a cross-section along a thickness direction of one example of a resin sheet.

The presently disclosed resin sheet is a resin sheet 10 that is formed using a thermoplastic resin and includes a plurality of aspheric sections 11 as illustrated in FIG. 1 for cross-sectional shape along a thickness direction, for example. In the presently disclosed resin sheet 10, the arrangement density of the aspheric sections 11 is required to be 0.16 sections/cm$^2$ or more, the minimum spacing P between adjacent aspheric sections 11 is required to be 1.0 mm or more, the diameter D of the aspheric sections 11 in plan view is required to be not less than 1 mm and not more than 15 mm, the retardation of the aspheric sections 11 is required to be 50 nm or less, and the thickness of a thinnest section $H_{min}$ is required to be 500 μm or less. When the arrangement density, minimum spacing, diameter, and retardation of the aspheric sections and the thickness of the thinnest section of the resin sheet are within the ranges set forth above, variation of thickness precision of the aspheric sections can be reduced, and shape precision of the aspheric sections can be increased.

Note that the shape of the aspheric sections of the resin sheet is not limited to the shape illustrated in FIG. 1 and may be any aspheric shape such as that of a plano-convex lens, a double convex lens, a convex meniscus lens, a plano-concave lens, a double concave lens, or a concave meniscus lens. The aspheric sections of the resin sheet can be cut out from the resin sheet and suitably be used as aspheric lens, for example, but are not specifically limited to being used in this manner. From a viewpoint of enabling advantageous use as a transmissive optical element such as a lens, it is preferable that at least one surface of the aspheric sections has a thickness direction cross-sectional shape that is a shape including an inflection point.

<Thermoplastic Resin>

The thermoplastic resin may be a (meth)acrylic resin, an alicyclic structure-containing resin, a styrene-based resin, a polycarbonate resin, a polyester resin, a polyether resin, a urethane resin, an olefin resin, a thiourethane resin, or the like, for example. Note that "(meth)acryl" indicates "acryl" and/or "methacryl". One of the thermoplastic resins described above may be used individually, or two or more of these thermoplastic resins may be used as a mixture.

Of these examples, an alicyclic structure-containing resin is preferably included in the thermoplastic resin due to having excellent transparency.

An alicyclic structure-containing resin is a polymer that includes an alicyclic structure such as a saturated cyclic hydrocarbon structure or an unsaturated cyclic hydrocarbon structure in a main chain and/or side chain. In particular, a polymer that includes a cycloalkane structure in a main chain is preferable because this makes it easy to obtain a resin sheet having excellent mechanical strength and heat resistance. The proportion constituted by repeating units having an alicyclic structure in the constituent polymer (hereinafter, also referred to as the "alicyclic structure-containing polymer") of the alicyclic structure-containing resin is not specifically limited but is preferably 50 mass % or more, more preferably 70 mass % or more, and even more preferably 90 mass % or more relative to all repeating units included in the polymer. By using an alicyclic structure-containing polymer in which the proportion constituted by repeating units having an alicyclic structure is 50 mass % or more, it is easy to obtain a resin sheet having excellent transparency and heat resistance.

Specific examples of alicyclic structure-containing polymers include norbornene-based polymers, monocyclic cycloolefin-based polymers, cyclic conjugated diene-based polymers, and vinyl alicyclic hydrocarbon-based polymers. Of these alicyclic structure-containing polymers, a norbornene-based polymer is preferable from a viewpoint of increasing the transparency, heat resistance, and mechanical strength of the obtained resin sheet. Note that in the present specification, these polymers are considered to refer not only to polymerization reaction products but also to hydrogenated products thereof.

A norbornene-based polymer is a polymer of a norbornene-based monomer or a hydrogenated product thereof. The norbornene-based polymer may be a ring-opened polymer of a norbornene-based monomer, a ring-opened polymer of a norbornene-based monomer and another monomer that can undergo ring-opening copolymerization therewith, an addition polymer of a norbornene-based monomer, an addition polymer of a norbornene-based monomer and another monomer that can undergo copolymerization therewith, a hydrogenated product of any of these polymers, or the like. Of these norbornene-based polymers, a hydrogenated ring-opened polymer of a norbornene-based monomer (i.e., a hydrogenated norbornene-based ring-opened polymer) is preferable. By using a hydrogenated norbornene-based ring-opened polymer, it is possible to further increase transparency, heat resistance, mechanical strength, and so forth of the resin sheet and also to increase releasability and transferability during production of the resin sheet by hot press forming.

The norbornene-based monomer may be bicyclo[2.2.1]hept-2-ene (common name: norbornene) or a derivative thereof, tricyclo[4.3.0$^{1,6}$.1$^{2,5}$]deca-3,7-diene (common name: dicyclopentadiene) or a derivative thereof, 7,8-benzotricyclo[4.3.0.1$^{2,5}$]dec-3-ene (common name: methanotetrahydrofluorene; also referred to as 1,4-methano-1,4,4a,9a-tetrahydrofluorene) or a derivative thereof, tetracyclo[4.4.0.1$^{2,5}$.1$^{7,10}$]dodec-3-ene (common name: tetracyclododecene) or a derivative thereof, or the like. Examples of substituents that can be included in a derivative include an alkyl group, an alkylene group, a vinyl group, an alkoxycarbonyl group, and an alkylidene group. For example, 8-methoxycarbonyl-tetracyclo[4.4.0.1$^{2,5}$.1$^{7,10}$]dodec-3-ene, 8-methyl-8-methoxycarbonyl-tetracyclo[4.4.0.1$^{2,5}$.1$^{7,1o}$]dodec-3-ene, 8-ethylidene-tetracyclo[4.4.0.1$^{2,5}$.1$^{7,1o}$]dodec-3-ene, or the like may be used as a derivative serving as a norbornene-based monomer. One of these norbornene-based monomers may be used individually, or two or more of these norbornene-based monomers may be used in combination.

Examples of other monomers that can undergo ring-opening copolymerization with a norbornene-based monomer include monocyclic cycloolefin-based monomers such as cyclohexene, cycloheptene, and cyclooctene. Examples of other monomers that can undergo addition copolymerization with a norbornene-based monomer include α-olefins having a carbon number of 2 to 20 such as ethylene, propylene, 1-butene, 1-pentene, and 1-hexene and derivatives thereof; cycloolefins such as cyclobutene, cyclopentene, cyclohexene, cyclooctene, and 3a,5,6,7a-tetrahydro-4,7-methano-1H-indene and derivatives thereof; and nonconjugated dienes such as 1,4-hexadiene, 4-methyl-1,4-hexadiene, 5-methyl-1,4-hexadiene, and 1,7-octadiene.

A ring-opened polymer or addition polymer including a norbornene-based monomer such as described above can be synthesized through polymerization performed in the presence of a commonly known catalyst. Moreover, a hydrogenated product of such a polymer can be obtained through a hydrogenation reaction performed using a commonly known hydrogenation catalyst.

Note that examples of monocyclic cycloolefin-based polymers, cyclic conjugated diene-based polymers, and vinyl alicyclic hydrocarbon-based polymers include those described in WO2017/126599A1, for example.

Moreover, a commercially available product may be used as an alicyclic structure-containing polymer or other thermoplastic resin. Specific examples of commercially available products of alicyclic structure-containing polymers, for example, include ZEONEX® (ZEONEX is a registered trademark in Japan, other countries, or both) produced by Zeon Corporation, APEL® (APEL is a registered trademark in Japan, other countries, or both) produced by Mitsui Chemicals, Inc., ARTON® (ARTON is a registered trademark in Japan, other countries, or both) produced by JSR Corporation, and TOPAS® (TOPAS is a registered trademark in Japan, other countries, or both) produced by Polyplastics Co., Ltd. Examples of commercially available products of olefin resins include TPX® (TPX is a registered trademark in Japan, other countries, or both) produced by Mitsui Chemicals, Inc.

The glass-transition temperature (Tg) of the thermoplastic resin is not specifically limited but is preferably 100° C. or higher, and more preferably 120° C. or higher, and is preferably 200° C. or lower, and more preferably 160° C. or lower. When the glass-transition temperature (Tg) of the thermoplastic resin is not lower than any of the lower limits set forth above, shape precision of the aspheric sections of the resin sheet can be further increased. Moreover, when the glass-transition temperature (Tg) of the thermoplastic resin film is not higher than any of the upper limits set forth above, production efficiency of the resin sheet can be increased, and shape precision of the aspheric sections can be further increased.

Note that the resin sheet may contain components other than a resin component such as described above. Examples of components other than the resin component include additives such as light stabilizers, ultraviolet absorbers, infrared absorbers, antioxidants, mold release agents, antistatic agents, carbon materials (carbon, etc.), pigments, and dyes. The amounts of these components can be set as appropriate without any specific limitations. The total amount of these additives can, for example, be 20 mass % or less, and preferably 10 mass % or less when the resin component is taken to be 100 mass %.

<Aspheric Sections>

The aspheric sections are required to have an arrangement density of 0.16 sections/cm$^2$ or more. Moreover, the arrangement density of the aspheric sections is preferably 0.30 sections/cm$^2$ or more, and more preferably 0.40 sections/cm$^2$ or more, and is preferably 3.0 sections/cm$^2$ or less, more preferably 2.0 sections/cm$^2$ or less, even more preferably 1.0 sections/cm$^2$ or less, and particularly preferably 0.60 sections/cm$^2$ or less. When the arrangement density of the aspheric sections is 0.16 sections/cm$^2$ or more, variation of thickness precision of the aspheric sections can be reduced, and shape precision of the aspheric sections can be increased. Moreover, when the arrangement density of the aspheric sections is not more than any of the upper limits set forth above, birefringence can be reduced, and variation of thickness precision can be further reduced.

The minimum spacing between adjacent aspheric sections is required to be 1.0 mm or more, and is preferably 3.0 mm or more, more preferably 5.0 mm or more, and even more preferably 7.0 mm or more. When the minimum spacing between the aspheric sections is 1.0 mm or more, variation of thickness precision of the aspheric sections can be reduced, and shape precision of the aspheric sections can be increased. Moreover, when the minimum spacing between the aspheric sections is 1.0 mm or more, the formation of bubbles and air pockets in the resin sheet can be inhibited even in a situation in which the resin sheet is produced by a shaping method such as press forming, for example. Note that the minimum spacing between the aspheric sections is normally 20 mm or less.

The diameter of the aspheric sections in plan view is required to be not less than 1 mm and not more than 15 mm. Moreover, the diameter of the aspheric sections is preferably 3 mm or more, and is preferably 9 mm or less. When the diameter of the aspheric sections is within any of the ranges set forth above, variation of thickness precision of the aspheric sections can be reduced, and shape precision of the aspheric sections can be increased.

The thickness at the center of the aspheric sections is preferably 50 μm or more, and more preferably 100 μm or more, and is preferably 1,500 μm or less, and more preferably 1,000 μm or less. When the thickness at the center of the aspheric sections is within any of the ranges set forth above, the aspheric sections can advantageously be used as transmissive optical elements such as lenses.

Variation of thickness precision of the aspheric sections is preferably 0.2 μm or less, and more preferably 0.1 μm or less. When variation of thickness precision is not more than any of the upper limits set forth above, birefringence of the aspheric sections can be reduced.

The retardation of the aspheric sections is required to be 50 nm or less, and is preferably 20 nm or less. When the retardation is not more than any of the upper limits set forth above, variation of thickness precision of the aspheric sections can be reduced, and shape precision of the aspheric sections can be increased.

<Properties of Resin Sheet>

The thickness of a thinnest section of the resin sheet is required to be 500 μm or less. Moreover, the thickness of the thinnest section of the resin sheet is preferably 50 μm or more, and more preferably 100 μm or more, and is preferably 300 μm or less, and more preferably 200 μm or less. When the thickness of the thinnest section is not more than any of the upper limits set forth above, variation of thickness precision of the aspheric sections can be reduced, and shape precision of the aspheric sections can be increased. Moreover, when the thickness of the thinnest section is not less than any of the lower limits set forth above, strength of the resin sheet can be sufficiently ensured.

(Method of Producing Resin Sheet)

The presently disclosed method of producing a resin sheet is a method of hot press forming a thermoplastic resin film formed using a thermoplastic resin so as to produce a resin sheet including a plurality of aspheric sections that are separated from one another and can, for example, be used in production of the presently disclosed resin sheet set forth above, but is not specifically limited to being used in this manner. The presently disclosed method of producing a resin sheet may, for example, include a "hot pressing step" of holding a thermoplastic resin film for a certain time while being heated and pressed by at least one pair of molds so as to obtain a hot pressed film, a "mold cooling step" of cooling the pair of molds to a temperature not higher than the glass-transition temperature of the thermoplastic resin after the hot pressing step so as to cool the hot pressed film, and a "mold release step" of releasing the hot pressed film from the pair of molds after the mold cooling step so as to obtain a resin sheet, and a feature of the presently disclosed method of producing a resin sheet is that the hot pressing in the hot pressing step is performed by increasing the pressing pressure to a final pressing pressure with an average pressure increase rate of 0.1 MPa/s or less at a pressing temperature that is at least 40° C. higher than the glass-transition temperature of the thermoplastic resin.

As a result of the average pressure increase rate of the pressing pressure and the pressing temperature during the hot press forming being set within specific ranges in the presently disclosed method of producing a resin sheet, the presently disclosed method of producing a resin sheet makes it simple to produce a resin sheet including a plurality of aspheric sections having low variation of thickness precision and high shape precision.

Note that the presently disclosed method of producing a resin sheet may, prior to the hot pressing step, include a conveying step of conveying the thermoplastic resin film in a specific conveyance direction. The air pressure of an environment in which the steps of the presently disclosed method of producing a resin sheet are implemented is not specifically limited and can be within the range of a standard state defined in JIS Z8703. The steps of the presently disclosed method of producing a resin sheet can be implemented by any means without any specific limitations but are preferably implemented by what is referred to as a "roll-to-roll" production means. This is because resin sheet production efficiency can be increased by implementing the steps using a roll-to-roll production means.

<Resin Sheet>

No specific limitations are placed on the resin sheet produced by the presently disclosed method of producing a resin sheet so long as it includes a plurality of aspheric sections that are separated from one another. In particular, the resin sheet is preferably a resin sheet having the same properties as the presently disclosed resin sheet set forth above.

<Thermoplastic Resin Film>

The thermoplastic resin used in the thermoplastic resin film may be any of the same thermoplastic resins as for the thermoplastic resin of the presently disclosed resin sheet set forth above, for example, but is not specifically limited thereto. Note that the term "film" indicates a body having a shape with a front surface and a rear surface (i.e., main surfaces) that are opposite surfaces separated by a distance corresponding to the thickness of the body.

A suitable commonly known method can be adopted as the method by which the thermoplastic resin film is produced without any specific limitations. For example, the thermoplastic resin film can be obtained by mixing specific components to obtain a shaping material for thermoplastic resin film production and then using this shaping material in melt extrusion, melt casting, injection molding, or the like.

The thickness of the thermoplastic resin film can be selected as appropriate depending on the diameter of the aspheric sections of the resin sheet that is to be produced. For example, the thickness of the thermoplastic resin film is normally 50 μm or more, and preferably 70 μm or more, and is normally 500 μm or less, and preferably 400 μm or less. Note that in a case in which there is variation of thickness of the thermoplastic resin film, the thickness of the thermoplastic resin film corresponds to a value of the simple arithmetic mean for thicknesses at a plurality of randomly selected measurement points.

<Conveying Step>

In the conveying step, the thermoplastic resin film is conveyed in a specific conveyance direction, in advance of the hot pressing step, to a position at which hot pressing is to be performed. The conveyance direction is preferably a direction that runs along a longitudinal direction that is perpendicular to a width direction of the thermoplastic film.

<Hot Pressing Step>

In the hot pressing step, the thermoplastic resin film is hot pressed by at least one pair of molds with a specific average pressure increase rate and pressing temperature so as to obtain a hot pressed film. So long as at least one pair of molds is used in the hot pressing step, no specific limitations are made, and one pair of molds may be used to perform hot pressing of the thermoplastic resin film, or a plurality of pairs of molds may be used to perform hot pressing of different sections of a single thermoplastic resin film at the same or different times. As a result of the thermoplastic resin film being subjected to hot pressing using molds in the presently disclosed method of producing a resin sheet, rather than using injection molding, it is possible to inhibit birefringence from arising in the aspheric sections of the obtained resin sheet.

[Molds]

The molds can be molds having any shape such as flat plate molds without any specific limitations so long as at least one of the molds includes a plurality of cavities that serve as aspheric section-forming regions.

A commonly known material can be used as the material of the molds. For example, carbon steel, stainless steel, and alloys based thereon may be used, of which, stainless steel such as STAVAX® (STAVAX is a registered trademark in Japan, other countries, or both) produced by Uddeholm is preferable from a viewpoint of processability and hardness. Moreover, it is preferable to use a mold that has undergone plating with a metal such as chromium, titanium, or nickel at the mold surface from a viewpoint of releasability. In particular, a mold that has undergone electroless nickel-phosphorus plating at the mold surface is more preferable.

At least one of the molds used in the presently disclosed production method includes a plurality of cavities having a discrete arrangement in a planar direction of the mold. The plurality of cavities are preferably separated from one another with equal spacing therebetween in the planar direction of the mold.

Note that the pair of molds may both include a plurality of cavities. This is because a resin sheet that has been shaped at both surfaces can be efficiently produced when shaping is performed using a pair of molds that each include cavities. The pair of molds may of course each have the same shape or may have different shapes depending on the shape of the resin sheet that is to be produced.

The arrangement density of the cavities is preferably 0.16 cavities/cm$^2$ or more, more preferably 0.30 cavities/cm$^2$ or more, and even more preferably 0.40 cavities/cm$^2$ or more, and is preferably 3.0 cavities/cm$^2$ or less, more preferably 2.0 cavities/cm$^2$ or less, even more preferably 1.0 cavities/cm$^2$ or less, and particularly preferably 0.60 cavities/cm$^2$ or less. When the arrangement density of the cavities is 0.16 cavities/cm$^2$ or more, variation of thickness precision of the aspheric sections of the obtained resin sheet can be reduced, and shape precision of the aspheric sections can be increased. Moreover, when the arrangement density of the cavities is not more than any of the upper limits set forth above, birefringence can be reduced, and variation of thickness precision can be further reduced.

The minimum spacing between adjacent cavities is preferably 1.0 mm or more, more preferably 3.0 mm or more, even more preferably 5.0 mm or more, and particularly preferably 7.0 mm or more. When the minimum spacing between the cavities is 1.0 mm or more, variation of thickness precision of the aspheric sections of the obtained resin sheet can be reduced, and shape precision of the aspheric sections can be increased. Moreover, when the minimum spacing of the cavities is 1.0 mm or more, the formation of bubbles and air pockets in the resin sheet can be inhibited. Note that the minimum spacing between the cavities is normally 20 mm or less.

The diameter of the cavities in plan view is preferably not less than 1 mm and not more than 15 mm, is more preferably 3 mm or more, and is more preferably 9 mm or less. When the diameter of the cavities is within any of the ranges set forth above, variation of thickness precision of the aspheric sections of the obtained resin sheet can be reduced, and shape precision of the aspheric sections can be increased.

The depth (distance in a direction corresponding to the thickness direction of the formed aspheric sections) at the center of the cavities with the molds in a closed state is preferably 50 μm or more, and more preferably 100 μm or more, and is preferably 1,500 μm or less, and more preferably 1,000 μm or less. When the depth at the center of the cavities is within any of the ranges set forth above, the aspheric sections of the obtained resin sheet can advantageously be used as transmissive optical elements such as lenses.

The minimum spacing between resin sheet-forming surfaces of the molds in a closed state (closed mold state) is preferably 50 μm or more, and more preferably 100 μm or more, and is preferably 500 μm or less, more preferably 300 μm or less, and even more preferably 200 μm or less. When the minimum spacing is not more than any of the upper limits set forth above, variation of thickness precision of the aspheric sections of the obtained resin sheet can be reduced, and shape precision of the aspheric sections can be increased. Moreover, when the minimum spacing is not less than any of the lower limits set forth above, strength of the obtained resin sheet can be sufficiently ensured.

[Pressing Temperature]

The pressing temperature (mold temperature) during hot pressing of the thermoplastic resin film by the pair of molds in the hot pressing step is required to be not lower than a temperature (Tg+40° C.) that is 40° C. higher than the glass-transition temperature (Tg) of the thermoplastic resin. Moreover, the pressing temperature is preferably not lower than a temperature (Tg+50° C.) that is 50° C. higher than the glass-transition temperature, and is preferably not lower than a temperature (Tg+55° C.) that is 55° C. higher than the glass-transition temperature. When the pressing temperature is not lower than any of the lower limits set forth above, variation of thickness precision of the aspheric sections of the obtained resin sheet can be reduced, and shape precision of the aspheric sections can be increased. Note that the pressing temperature is preferably not higher than a temperature (Tg+80° C.) that is 80° C. higher than the glass-transition temperature from a viewpoint of efficiently producing a resin sheet.

The pressing temperature can be adjusted as appropriate without any specific limitations by controlling the temperature of the molds according to a typical known method (for example, a temperature control method using a known heater, cooler, or the like).

[Pressing Pressure]

In the hot pressing step, the pressing pressure during hot pressing of the thermoplastic resin film by the molds is increased to a final pressing pressure at a specific pressure increase rate and is optionally held at the final pressing pressure for a specific time.

—Pressure Increase Rate—

The average pressure increase rate of the pressing pressure is required to be 0.1 MPa/s or less, and is preferably 0.07 MPa/s or less, and more preferably 0.05 MPa/s or less. When the average pressure increase rate is not more than any of the upper limits set forth above, birefringence of the aspheric sections of the obtained resin sheet can be reduced, and shape precision of the aspheric sections can be increased. Note that the average pressure increase rate is preferably 0.04 MPa/s or more from a viewpoint of efficiently producing a resin sheet.

Although the pressure increase rate of the pressing pressure does not need to be a constant rate so long as the average pressure increase rate is 0.1 MPa/s or less, the pressure increase rate of the pressing pressure is preferably 0.1 MPa/s or less, more preferably 0.07 MPa/s or less, and even more preferably 0.05 MPa/s or less throughout the entire hot pressing step from a viewpoint of further reducing birefringence of the aspheric sections of the obtained resin sheet and further increasing shape precision of the aspheric sections.

Moreover, from a viewpoint of further increasing shape precision of the aspheric sections and further reducing birefringence and variation of thickness precision of the aspheric sections, it is preferable that the pressing pressure is increased to the final pressing pressure with a constant pressure increase rate in the hot pressing step, more preferable that the pressing pressure is increased to the final pressing pressure with a constant pressure increase rate of 0.1 MPa/s or less in the hot pressing step, even more preferable that the pressing pressure is increased to the final pressing pressure with a constant pressure increase rate of 0.07 MPa/s or less in the hot pressing step, and particularly preferable that the pressing pressure is increased to the final pressing pressure with a constant pressure increase rate of 0.05 MPa/s or less in the hot pressing step.

—Final Pressing Pressure—

The final pressing pressure can be set as not lower than 1 MPa and not higher than 10 MPa, for example, but is not specifically limited thereto. When the final pressing pressure is within the range set forth above, shape precision of the aspheric sections of the obtained resin sheet can be further increased, and birefringence and variation of thickness precision of the aspheric sections can be further reduced.

[Other Pressing Conditions]

The pressing time in the hot pressing step can be set as appropriate depending on the type and size of the thermoplastic resin film that is used, the shape and size of the target resin sheet, and so forth, without any specific limitations. For example, the time taken to increase the pressing pressure to the final pressing pressure can be set as not less than 20 seconds and not more than 300 seconds, and the time for which the pressing pressure is held at the final pressing pressure can be set as not less than 0 seconds and not more than 180 seconds.

<Mold Cooling Step>

In the mold cooling step, the pair of molds are cooled to a temperature that is not higher than the glass-transition temperature of the thermoplastic resin film so as to cool the hot pressed film. By implementing this step, shape precision of the aspheric sections of the obtained resin sheet can be increased. Note that the start point of the mold cooling step may, for example, be a point at which temperature control for cooling the molds begins once a specific time has elapsed from a start point of the hot pressing step or may, for example, be a point at which heat input to the molds is stopped once a specific time has elapsed from the start point of the hot pressing step. The end point of the mold cooling step may be a point at which the mold temperature had dropped to the mold cooling temperature described below or may be a point once a specific time (for example, 50 seconds) has elapsed from the aforementioned point.

[Mold Cooling Temperature]

The mold cooling temperature is required to be not higher than the glass-transition temperature (Tg) of the thermoplastic resin, and is preferably not higher than a temperature (Tg—15° C.) that is 15° C. lower than the glass-transition temperature, and more preferably not higher than a temperature (Tg—30° C.) that is 30° C. lower than the glass-transition temperature. Moreover, the mold cooling temperature is preferably not lower than a temperature (Tg—80° C.) that is 80° C. lower than the glass-transition temperature, and more preferably not lower than a temperature (Tg—75° C.) that is 75° C. lower than the glass-transition temperature. When the mold cooling temperature is not higher than any of the upper limits set forth above, mold release can easily be performed in the subsequently described mold release step, and shape precision of the aspheric sections of the obtained resin sheet can be effectively increased. Moreover, when the mold cooling temperature is not lower than any of the lower limits set forth above, production efficiency of a resin sheet can be further increased.

[Other Mold Cooling Conditions]

The mold cooling time, mold cooling rate, and so forth can be set as appropriate depending on the type and size of the thermoplastic resin film, the shape and size of the aspheric sections of the target resin sheet, and so forth, without any specific limitations. For example, the mold cooling time can be set as not less than 10 seconds and not more than 100 seconds, and the mold cooling rate can be set as not less than 50° C./min and not more than 300° C./min.

<Mold Release Step>

In the mold release step, the hot pressed film is released from the molds after the mold cooling step so as to obtain a resin sheet. From a viewpoint of increasing shape precision of the aspheric sections of the resin sheet, it is preferable that tension is applied to the hot pressed film while it is being released. The tension preferably acts as a force in a direction along the conveyance direction. The method by which the tension is controlled in the mold release step is not specifically limited and can be through control by a commonly known method. For example, the control can be performed through an unwinding roll of the hot pressed film, a winding roll for winding up the hot pressed film, a nip roll separately provided for tension control, or the like.

Furthermore, it is preferable that tension is applied continuously or intermittently to the thermoplastic resin film not only in the mold release step but also at each stage up to the point at which the mold release step starts from a mold heating step at which the thermoplastic resin film and either one of the pair of molds come into contact in the previously described hot pressing step. This is preferable because it can further increase shape precision of the aspheric sections of the obtained resin sheet. Of course, tension may also be applied to the thermoplastic resin film in other steps that are not performed during the period described above. In other words, tension may be applied to the thermoplastic resin film throughout all steps from the conveying step through to steps that can be performed after the mold release step.

[Tension]

The magnitude of the tension acting on the hot pressed film in the conveyance direction is preferably 1 N or more, and more preferably 10 N or more per 1 m of width of the thermoplastic resin film, and is preferably 2,000 N or less, and more preferably 1,000 N or less per 1 m of width of the thermoplastic resin film. Note that the "width of the thermoplastic resin film" is a direction that is perpendicular to the conveyance direction. When the magnitude of the tension is not less than any of the lower limits set forth above, shape precision of the aspheric sections of the obtained resin sheet can be further increased. Moreover, when the magnitude of the tension is not more than any of the upper limits set forth above, rupturing of the hot pressed film can be inhibited, and production efficiency of a resin sheet can be further increased.

EXAMPLES

The following provides a more detailed description of the present disclosure through examples and comparative examples. However, the present disclosure is not in any way limited by these examples. The glass-transition temperature of a thermoplastic resin was measured as described below in the examples and comparative examples. Moreover, the shape precision, variation of thickness precision, and retardation of aspheric sections of a resin sheet were evaluated as described below in the examples and comparative examples.

<Glass-Transition Temperature of Thermoplastic Resin Film>

The glass-transition temperature (Tg) of a thermoplastic resin was measured under conditions of a heating rate 10° C./min based on JIS K7121 using a differential scanning calorimeter (DSC6220 produced by SIT NanoTechnology).

<Shape Precision>

Aspheric sections of a resin sheet were punched out to obtain measurement samples.

Next, for each of 300 measurement samples among the punched-out aspheric sections, a shape measuring instrument (UA-3P produced by Panasonic Corporation) was used to measure a PV value (maximum error of measurement sample surface shape relative to reference surface (i.e., difference between highest point (Peak) and lowest point (Valley) in measurement range)) using aspheric design values as a reference. The simple mean of the measured PV values was evaluated by the following standard as the shape precision.

A: Simple mean of PV value is 0.5 μm or less
B: Simple mean of PV value is more than 0.5 μm and not more than 1.0
C: Simple mean of PV value is more than 1.0 μm <Variation of Thickness Precision>

Aspheric sections of a resin sheet were punched out to obtain measurement samples.

Next, for each of 300 measurement samples among the punched-out aspheric sections, the thickness at the center thereof was measured using a shape measurement instrument (UA-3P produced by Panasonic Corporation). The standard deviation of the measured thicknesses was evaluated by the following standard as the variation of thickness precision.

A: Standard deviation is 0.1 μm or less
B: Standard deviation is more than 0.1 μm and not more than 0.2 μm
C: Standard deviation is more than 0.2 μm <Retardation>

Aspheric sections of a resin sheet were punched out to obtain measurement samples.

Next, for each of 300 measurement samples among the punched-out aspheric sections, retardation was measured using a resin molded lens inspection system (WPA-100 produced by Photonic Lattice Inc.).

The simple mean of retardation values obtained as standardized values at the measurement wavelength (543 nm) was evaluated in accordance with the following standard. A smaller value for the retardation indicates lower birefringence.

A: Simple mean of retardation is 20 nm or less
B: Simple mean of retardation is more than 20 nm and not more than 50 nm
C: Simple mean of retardation is more than 50 nm

Example 1

A thermoplastic resin (ZEONEX E48R (produced by Zeon Corporation); glass-transition temperature: 139° C.) containing a hydrogenated norbornene-based ring-opened polymer was loaded into a film extrusion molding machine (single-screw extruder; Ø=20 mm; produced by GSI Creos Corporation), was melted at 260° C., and then molten resin was extruded from a T-die and was cooled to obtain a thermoplastic resin film having a thickness of 500 μm and a width of 295 mm. Note that a longitudinal direction of the thermoplastic film was a direction perpendicular to the width direction of the thermoplastic film, and the thermoplastic film was of sufficient length to enable shaping by a roll-to-roll shaping method.

The thermoplastic resin film obtained as described above was set in a hot press forming machine including a pair of molds equipped with a temperature adjustment device (conveying step). Note that molds having properties indicated in Table 1 were used as the pair of molds.

The mold temperature was increased up to a pressing temperature indicated in Table 1 and then hot pressing of the thermoplastic resin film was performed under conditions indicated in Table 1 (hot pressing step). The pair of molds were cooled to 100° C. with the hot pressed film still in a pressed state, and the hot pressed film in a sandwiched state between the molds was cooled (mold cooling step).

Thereafter, the molds were opened, the mold cooling step was ended, and a resin sheet having properties indicated in Table 1 was released from the molds (mold release step).

Results for various evaluations that were performed as previously described with respect to the obtained resin sheet are shown in Table 1 together with the time (cycle time) required from the start of the conveying step through to the end of the mold release step.

Example 2

A resin sheet was produced and various evaluations were performed in the same way as in Example 1 with the exception that the pressure increase rate during hot pressing was changed to a rate indicated in Table 1. The results are shown in Table 1.

Examples 3 and 4

A resin sheet was produced and various evaluations were performed in the same way as in Example 1 with the exception that the pressing temperature was changed to a temperature indicated in Table 1. The results are shown in Table 1.

Examples 5 to 7

A resin sheet was produced and various evaluations were performed in the same way as in Example 1 with the exception that the molds were changed to molds indicated in Table 1. The results are shown in Table 1.

Example 8

A resin sheet was produced and various evaluations were performed in the same way as in Example 1 with the exception that a thermoplastic resin (TOPAS 6013 (produced by Polyplastics Co., Ltd.); glass-transition temperature: 138° C.) containing a norbornene-ethylene random copolymer that was obtained through random addition polymerization using norbornene and ethylene as monomers was used as a thermoplastic resin film and that the pressing temperature was changed to a temperature indicated in Table 1. The results are shown in Table 1.

Example 9

A resin sheet was produced and various evaluations were performed in the same way as in Example 1 with the exception that a polycarbonate resin (WONDERLITE PC-115 (produced by Asahi Kasei Corporation); glass-transition temperature: 145° C.) was used as a thermoplastic resin film and that the pressing temperature was changed to a temperature indicated in Table 1. The results are shown in Table 1.

Example 10

A resin sheet was produced and various evaluations were performed in the same way as in Example 1 with the exception that a polymethyl methacrylate resin (DELPET 80NH (produced by Asahi Kasei Chemicals Corporation); glass-transition temperature: 100° C.) was used as a thermoplastic resin film and that the pressing temperature was changed to a temperature indicated in Table 1. The results are shown in Table 1.

Example 11

A resin sheet was produced and various evaluations were performed in the same way as in Example 1 with the exception that a polyester resin (OKP-1 (produced by Osaka Gas Chemicals Co., Ltd.); glass-transition temperature: 132° C.) was used as a thermoplastic resin film and that the pressing temperature was changed to a temperature indicated in Table 1. The results are shown in Table 1.

Comparative Example 1

A resin sheet was produced and various evaluations were performed in the same way as in Example 1 with the exception that the pressure increase rate during hot pressing was changed to a rate indicated in Table 1. The results are shown in Table 1.

Comparative Example 2

A resin sheet was produced and various evaluations were performed in the same way as in Example 1 with the exception that the pressing temperature was changed to a temperature indicated in Table 1. The results are shown in Table 1.

Comparative Example 3

A resin sheet was produced and various evaluations were performed in the same way as in Example 1 with the exception that the molds were changed to molds indicated in Table 1. The results are shown in Table 1.

TABLE 1

| | | | | Example 1 | Example 2 | Example 3 | Example 4 | Example 5 | Example 6 | Example 7 |
|---|---|---|---|---|---|---|---|---|---|---|
| Thermoplastic resin film | | Glass-transition temperature Tg (° C.) | | 139 | 139 | 139 | 139 | 139 | 139 | 139 |
| | | Thickness (μm) | | 500 | 500 | 500 | 500 | 500 | 500 | 500 |
| Hot pressing conditions | Hot pressing step | Molds | Cavity diameter (mm) | 5 | 5 | 5 | 5 | 5 | 5 | 5 |
| | | | Minimum spacing between cavities (mm) | 9 | 9 | 9 | 9 | 5 | 3 | 1 |
| | | | Arrangement density of cavities (cavities/cm$^2$) | 0.5 | 0.5 | 0.5 | 0.5 | 1.0 | 1.6 | 2.8 |
| | | Pressing temperature (° C.) | | 205 | 205 | 195 | 180 | 205 | 205 | 205 |
| | | Pressing temperature - Tg (° C.) | | 66 | 66 | 56 | 41 | 66 | 66 | 66 |
| | | Pressure increase rate (MPa/s) | | 0.045 | 0.07 | 0.045 | 0.045 | 0.045 | 0.045 | 0.045 |
| | | Pressure increase time (s) | | 211 | 136 | 211 | 211 | 211 | 211 | 211 |
| | | Final pressing pressure (MPa) | | 9.5 | 9.5 | 9.5 | 9.5 | 9.5 | 9.5 | 9.5 |
| | | Final pressing pressure holding time (s) | | 60 | 60 | 60 | 60 | 60 | 60 | 60 |
| | Mold cooling step | Cooling temperature (° C.) | | 100 | 100 | 100 | 100 | 100 | 100 | 100 |
| | | Cycle time (s) | | 360 | 300 | 345 | 320 | 360 | 360 | 360 |
| Resin sheet | Aspheric sections | Diameter D (mm) | | 5 | 5 | 5 | 5 | 5 | 5 | 5 |
| | | Minimum spacing P (mm) | | 9 | 9 | 9 | 9 | 5 | 3 | 1 |
| | | Arrangement density (sections/cm$^2$) | | 0.5 | 0.5 | 0.5 | 0.5 | 1.0 | 1.6 | 2.8 |
| | | Thickness $H_{mid}$ at center (μm) | | 600 | 600 | 600 | 600 | 600 | 600 | 600 |
| | | Thickness $H_{min}$ of thinnest section (μm) | | 150 | 150 | 150 | 150 | 150 | 150 | 150 |
| Evaluation | | Shape precision | | A | B | B | B | B | B | B |
| | | Variation of thickness precision | | A | A | B | B | A | A | B |
| | | Retardation | | A | A | A | B | A | B | B |

| | | | | Example 8 | Example 9 | Example 10 | Example 11 | Comparative Example 1 | Comparative Example 2 | Comparative Example 3 |
|---|---|---|---|---|---|---|---|---|---|---|
| Thermoplastic resin film | | Glass-transition temperature Tg (° C.) | | 138 | 145 | 100 | 132 | 139 | 139 | 139 |
| | | Thickness (μm) | | 500 | 500 | 500 | 500 | 500 | 500 | 500 |
| Hot pressing conditions | Hot pressing step | Molds | Cavity diameter (mm) | 5 | 5 | 5 | 5 | 5 | 5 | 5 |
| | | | Minimum spacing between cavities (mm) | 9 | 9 | 9 | 9 | 9 | 9 | 0 |
| | | | Arrangement density of cavities (cavities/cm$^2$) | 0.5 | 0.5 | 0.5 | 0.5 | 0.5 | 0.5 | 4.0 |
| | | Pressing temperature (° C.) | | 195 | 200 | 155 | 187 | 205 | 170 | 205 |
| | | Pressing temperature - Tg (° C.) | | 57 | 55 | 55 | 55 | 66 | 31 | 66 |
| | | Pressure increase rate (MPa/s) | | 0.045 | 0.045 | 0.045 | 0.045 | 0.12 | 0.045 | 0.045 |
| | | Pressure increase time (s) | | 211 | 211 | 211 | 211 | 79 | 211 | 211 |

TABLE 1-continued

| | | | | | | | | | |
|---|---|---|---|---|---|---|---|---|---|
| | Mold cooling step | Final pressing pressure (MPa) | 9.5 | 9.5 | 9.5 | 9.5 | 9.5 | 9.5 | 9.5 |
| | | Final pressing pressure holding time (s) | 60 | 60 | 60 | 60 | 60 | 60 | 60 |
| | | Cooling temperature (° C.) | 100 | 100 | 100 | 100 | 100 | 100 | 100 |
| | | Cycle time (s) | 360 | 360 | 360 | 360 | 240 | 305 | 360 |
| Resin sheet | Aspheric sections | Diameter D (mm) | 5 | 5 | 5 | 5 | 5 | 5 | 5 |
| | | Minimum spacing P (mm) | 9 | 9 | 9 | 9 | 9 | 9 | 0 |
| | | Arrangement density (sections/cm$^2$) | 0.5 | 0.5 | 0.5 | 0.5 | 0.5 | 0.5 | 4.0 |
| | | Thickness $H_{mid}$ at center (μm) | 600 | 600 | 600 | 600 | 600 | 600 | 600 |
| | | Thickness $H_{min}$ of thinnest section (μm) | 150 | 150 | 150 | 150 | 150 | 150 | 150 |
| Evaluation | | Shape precision | A | B | B | B | C | C | C |
| | | Variation of thickness precision | A | B | B | B | A | C | C |
| | | Retardation | A | A | A | A | C | C | C |

It can be seen from Table 1 that the resin sheets of Examples 1 to 11 each include a plurality of aspheric sections having low variation of thickness precision and high shape precision. It can also be seen that the resin sheet of Comparative Example 1 has low shape precision of aspheric sections and that the resin sheets of Comparative Examples 2 and 3 each have high variation of thickness precision and low shape precision of aspheric sections.

INDUSTRIAL APPLICABILITY

According to the present disclosure, it is possible to provide a resin sheet including a plurality of aspheric sections having low variation of thickness precision and high shape precision.

REFERENCE SIGNS LIST

10 resin sheet
11 aspheric section

The invention claimed is:

1. A method of producing a resin sheet comprising hot press forming a thermoplastic resin film formed using a thermoplastic resin so as to produce a resin sheet including a plurality of aspheric sections that are separated from one another, wherein
the hot press forming is performed by increasing pressing pressure to a final pressing pressure with an average pressure increase rate of 0.1 MPa/s or less at a pressing temperature that is at least 40° C. higher than a glass-transition temperature of the thermoplastic resin.

2. The method of producing a resin sheet according to claim 1, wherein the pressing pressure is increased to the final pressing pressure at a constant pressure increase rate of 0.1 MPa/s or less.

3. The method of producing a resin sheet according to claim 1, wherein at least one surface of the aspheric sections has a thickness direction cross-sectional shape that is a shape including an inflection point.

4. A resin sheet formed using a thermoplastic resin and comprising a plurality of aspheric sections, wherein
arrangement density of the aspheric sections is 0.16 sections/cm$^2$ or more,
minimum spacing between adjacent aspheric sections is 1.0 mm or more,
diameter of the aspheric sections in plan view is not less than 1 mm and not more than 15 mm,
retardation of the aspheric sections is 50 nm or less, and
thickness of a thinnest section is 500 μm or less.

5. The resin sheet according to claim 4, wherein variation of thickness precision of the aspheric sections is 0.2 μm or less.

6. The resin sheet according to claim 4, wherein at least one surface of the aspheric sections has a thickness direction cross-sectional shape that is a shape including an inflection point.

* * * * *